United States Patent
Hoang et al.

(10) Patent No.: US 11,783,429 B2
(45) Date of Patent: *Oct. 10, 2023

(54) AUTOMATED CONVERSION OF INCOMPATIBLE DATA FILES INTO COMPATIBLE BENEFIT PACKAGES FOR PHARMACY BENEFIT MANAGEMENT PLATFORM

(71) Applicant: MedImpact Healthcare Systems, Inc., San Diego, CA (US)

(72) Inventors: An Hoang, San Marcos, CA (US); Dustin Roberto, San Diego, CA (US)

(73) Assignee: MEDIMPACT HEALTHCARE SYSTEMS, INC., San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/879,459

(22) Filed: Aug. 2, 2022

(65) Prior Publication Data

US 2022/0374997 A1 Nov. 24, 2022

Related U.S. Application Data

(63) Continuation of application No. 16/664,583, filed on Oct. 25, 2019, now Pat. No. 11,410,244.

(Continued)

(51) Int. Cl.
*G06Q 40/08* (2012.01)
*G06Q 10/10* (2023.01)
(Continued)

(52) U.S. Cl.
CPC ............. *G06Q 40/08* (2013.01); *G06F 9/542* (2013.01); *G06F 40/166* (2020.01); *G06F 40/55* (2020.01); *G06Q 10/10* (2013.01)

(58) Field of Classification Search
None
See application file for complete search history.

(56) References Cited

U.S. PATENT DOCUMENTS 10,565,563 B1 *  2/2020  Hays ..................... G06F 40/186
11,144,688 B1 * 10/2021  Ershov .................. G06F 30/373
(Continued)

OTHER PUBLICATIONS

"Cole Werble, Formularies, Sep. 14, 2017, Health Policy Brief" (Year: 2017).*

(Continued)

*Primary Examiner* — Kito R Robinson
*Assistant Examiner* — Toan Duc Bui
(74) *Attorney, Agent, or Firm* — PROCOPIO, CORY, HARGREAVES & SAVITCH LLP

(57) ABSTRACT

Automated conversion of incompatible data files into compatible benefit packages for a pharmacy benefit management (PBM) platform. In an embodiment, client files, comprising representations of benefit plans, are received. Each representation comprises a plurality of field values. For each representation, a layout and a set of translation rules are received, the plurality of field values in the representation are mapped to a plurality of attribute values based on the layout, and a benefit package, comprising a plurality of components, is generated by applying the set of translation rules to the plurality of attribute values, such that the benefit package represents the benefit plan.

13 Claims, 6 Drawing Sheets

Related U.S. Application Data

(60) Provisional application No. 62/751,344, filed on Oct. 26, 2018.

(51) Int. Cl.
*G06F 9/54* (2006.01)
*G06F 40/55* (2020.01)
*G06F 40/166* (2020.01)

(56) References Cited

U.S. PATENT DOCUMENTS

| | | | |
|---|---|---|---|
| 2009/0183117 A1* | 7/2009 | Chang | G06F 3/04842 |
| | | | 715/810 |
| 2010/0161353 A1* | 6/2010 | Mayaud | G16H 10/60 |
| | | | 707/752 |
| 2014/0317563 A1* | 10/2014 | O'Byrne | G06F 16/258 |
| | | | 715/810 |
| 2017/0286389 A1* | 10/2017 | Ceneviva | G06F 40/106 |
| 2018/0373885 A1* | 12/2018 | Arad | G06F 21/6254 |
| 2020/0294642 A1* | 9/2020 | Bostic | G16H 50/20 |
| 2021/0035225 A1* | 2/2021 | Simpson | G06Q 40/08 |
| 2021/0042516 A1* | 2/2021 | Panakkal | G06V 30/413 |

OTHER PUBLICATIONS

"ASHP Guidelines on the Pharmacy and Therapeutics Committee and the Formulary System, 2021, ASHP Report, vol. 78, No. 10, 913-915" (Year: 2021).*

* cited by examiner

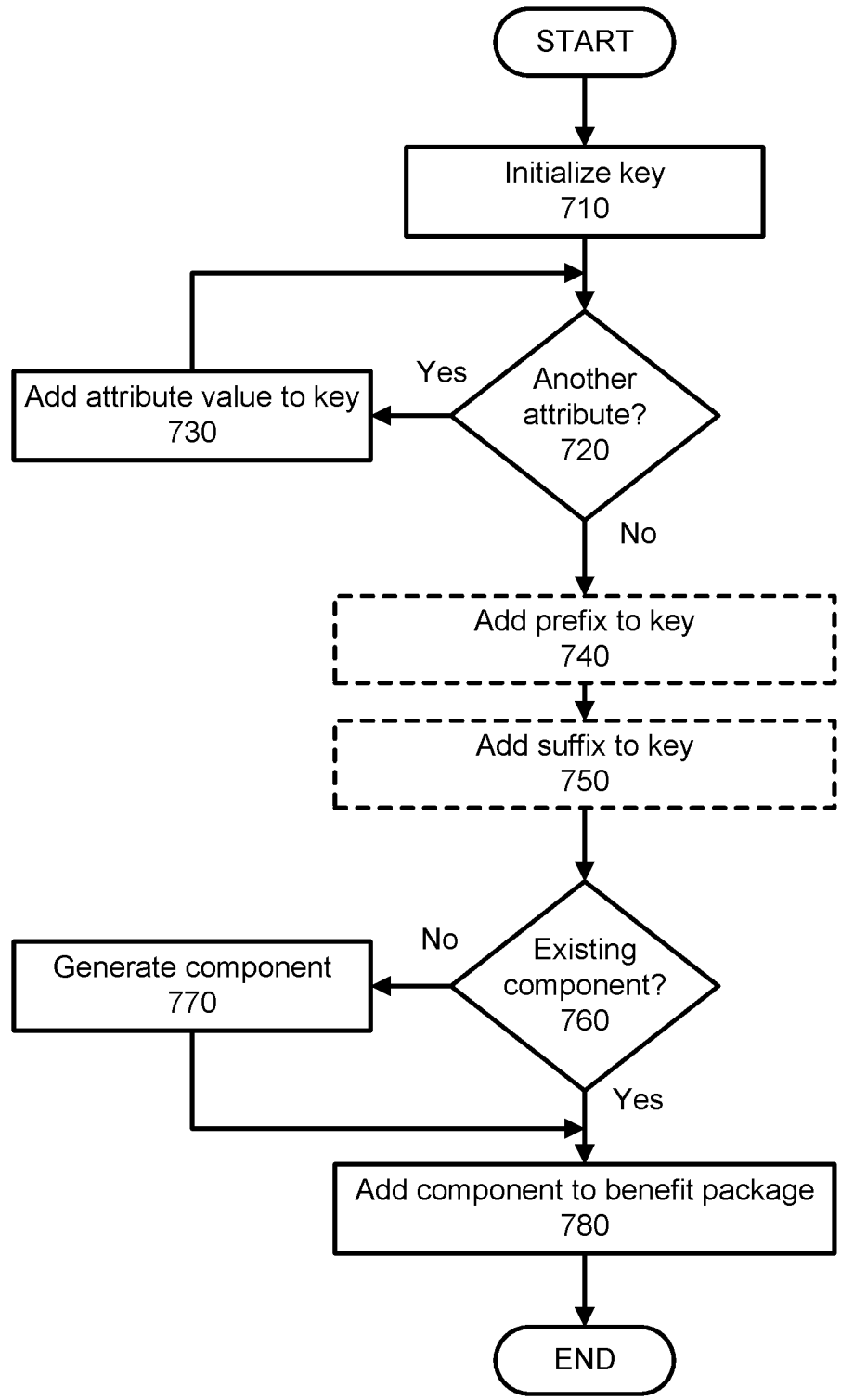

AUTOMATED CONVERSION OF INCOMPATIBLE DATA FILES INTO COMPATIBLE BENEFIT PACKAGES FOR PHARMACY BENEFIT MANAGEMENT PLATFORM

CROSS-REFERENCE TO RELATED APPLICATIONS

This application claims priority to U.S. patent application Ser. No. 16/664,583, filed on Oct. 25, 2019, which claims priority to U.S. Provisional Patent App. No. 62/751,344, filed on Oct. 26, 2018, which are both hereby incorporated herein by reference in their entireties as if set forth in full.

BACKGROUND

Field of the Invention

The embodiments described herein are generally directed to a pharmacy benefit management platform, and, more particularly, to the automated conversion of client benefit plans, represented in various different and incompatible formats, into benefit packages that are compatible for use with the pharmacy benefit management platform.

Description of the Related Art

A pharmacy benefits management (PBM) company is an administrator of prescription drug benefits programs. PBM companies are primarily responsible for adjudication and paying claims for covered prescription drugs that are purchased by consumers who are members of a benefit plan (e.g., prescription drug benefits program). Other typical PBM services include developing and maintaining the drug formulary (the list of drugs covered by the benefit plan and their associated tiers), contracting with pharmacies, and negotiating discounts and rebates with drug manufacturers.

PBM companies typically manage the benefit plans for a multitude of different clients, including, for example, commercial health plans, self-insured companies, and government programs. Each client will construct one or more desired benefit plans using the commercial or proprietary software of its choosing. Such software often enables exporting of data into commonly used file formats, such as Excel™ worksheets, comma-separated values (CSV), and/or the like. Some clients may even manually input the attributes of its desired benefit plan(s) into such file formats (e.g., using Microsoft Excel™). Inevitably, different clients will utilize different file formats.

Furthermore, even when different clients utilize the same file format, the clients or software will often format the content differently. For example, assume that two different clients both export their data, representing their benefit plans, in an Excel™ worksheet. One client may format the contents of their worksheet, such that each benefit plan is represented by a single row with all attributes for each benefit plan specified as values in the columns of the single row for that benefit plan. However, another client may format the contents of their worksheet, such that each benefit plan is represented by a plurality of rows with each attribute for each benefit plan specified on a separate row. Thus, a PBM company that manages hundreds or thousands of clients must deal with hundreds or thousands of different combinations of file and content formats.

Consequently, a PBM company must employ client benefit analysts (CBAs) to analyze each client's file, representing one or more benefit plans constructed using the client's system of choice, and manually import each benefit plans' attributes into data structures to be used in the PBM company's system. Not surprisingly, this is an expensive and time-consuming process.

SUMMARY

Accordingly, systems, methods, and non-transitory computer-readable media are disclosed for automated conversion of client benefit plans, represented in various different and incompatible formats, into benefit packages that are compatible for use with a pharmacy benefit management platform.

In an embodiment, a method is disclosed that comprises using at least one hardware processor to: receive one or more client files, wherein each of the one or more client files comprises one or more representations of a benefit plan, and wherein each of the one or more representations of a benefit plan comprises a plurality of field values; and, for each of the one or more representations of a benefit plan in each of the one or more client files, retrieve a layout and a set of translation rules, map the plurality of field values in the representation of the benefit plan to a plurality of attribute values based on the layout, and generate a benefit package comprising a plurality of components by applying the set of translation rules to the plurality of attribute values, wherein the benefit package represents the benefit plan. The plurality of components of the benefit package may comprise a cost share representing one or more of a copay, coinsurance, and accumulators limits of the represented benefit plan. In addition, the plurality of components of the benefit package may comprise one or more fulfillment channels or a formulary.

In an embodiment, applying the set of translation rules to the plurality of attribute values comprises: generating a key by combining two or more of the plurality of attribute values into a character string; and using the key as an index into a database of a plurality of existing formularies. Applying the set of translation rules to the plurality of attribute values may further comprise: when one of the plurality of existing formularies is retrieved by using the key as an index into the database, adding the retrieved existing formulary as the formulary of the benefit package; and, when none of the plurality of existing formularies is retrieved by using the key as an index into the database, generating a new formulary, and adding the new formulary to the plurality of existing formularies in the database. Generating the key may further comprise appending a prefix to the character string and/or appending a suffix to the character string. The new formulary may comprise a data structure comprising one or more data values, and generating the new formulary may comprise generating the data structure and automatically defining the one or more data values within the data structure. Alternatively, the new formulary may comprise a data structure comprising one or more data values, and generating the new formulary may comprise generating the data structure but not automatically defining the one or more data values within the data structure. In this case, the method may further comprise using the at least one hardware processor to prompt a user to define the one or more data values within the data structure of the new formulary.

In an embodiment, applying the set of translation rules to the plurality of attribute values comprises, for each of one or more rules within the set of translation rules: determining that the rule references one or more conditions; retrieving the one or more conditions; evaluating the retrieved one or more conditions by, for each of the one or more conditions, evaluating and comparing at least two expressions within the condition, wherein at least one of the at least two expressions references one or more of the plurality of attribute values; and applying the rule according to the evaluated one or more conditions.

In an embodiment, the method further comprises using the at least one hardware processor to validate the client file while mapping the plurality of field values to the plurality of attribute values based on the layout. The method may further comprise using the at least one hardware processor to, after validating the client file, prompt a user, via a graphical user interface, to generate the benefit package via an input of the graphical user interface, wherein the benefit package is generated in response to a user operation of the input.

In an embodiment, the method further comprises using the at least one hardware processor to: determine that the client file is invalid while mapping the plurality of field values to the plurality of attribute values based on the layout; and notify a user, via a graphical user interface, that the client file was determined to be invalid, prior to generating the benefit package. The benefit package may comprise a publication date. In this case, the method may further comprise using the at least one hardware processor to automatically activate the benefit package within a production environment on the publication date. In addition, the method may comprise using the at least one hardware processor to automatically adjudicate a plurality of benefit claims, submitted by one or more pharmacy systems over at least one network, according to the benefit package.

Any of the methods herein may be embodied in executable software modules of a processor-based system, such as a server, and/or in executable instructions stored in a non-transitory computer-readable medium.

BRIEF DESCRIPTION OF THE DRAWINGS

The details of the present invention, both as to its structure and operation, may be gleaned in part by study of the accompanying drawings, in which like reference numerals refer to like parts, and in which:

FIG. 7 is a flowchart that illustrates an example process for applying an example rule to produce a component of a benefit package, according to an embodiment.

DETAILED DESCRIPTION

In an embodiment, systems, methods, and non-transitory computer-readable media are disclosed for automated conversion of client benefit plans, represented in various different and incompatible formats, into benefit packages that are compatible for use with a pharmacy benefit management platform. After reading this description, it will become apparent to one skilled in the art how to implement the invention in various alternative embodiments and alternative applications. However, although various embodiments of the present invention will be described herein, it is understood that these embodiments are presented by way of example and illustration only, and not limitation. As such, this detailed description of various embodiments should not be construed to limit the scope or breadth of the present invention as set forth in the appended claims.

1. System Overview 1.1. Infrastructure

Figure 1:
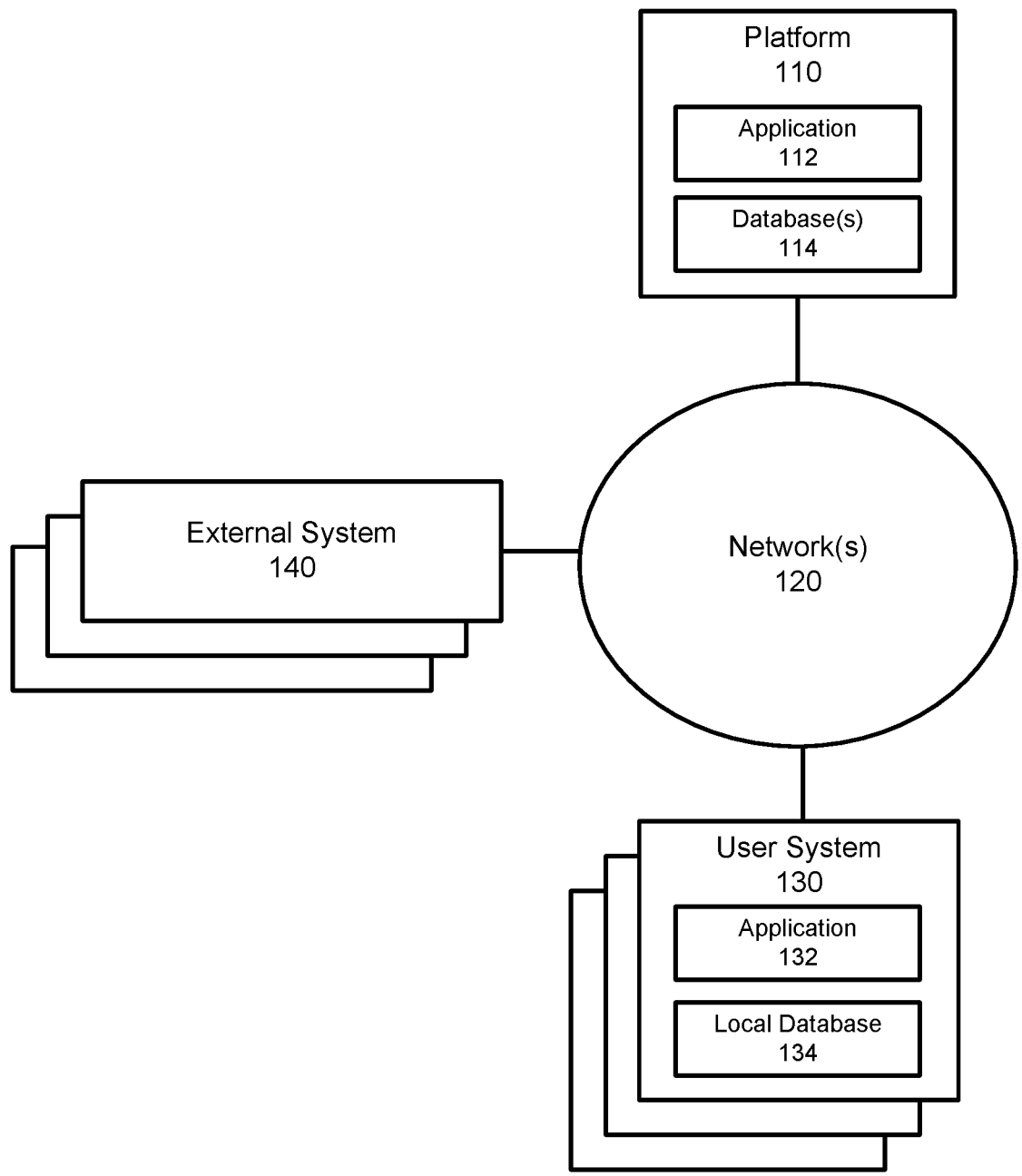
FIG. 1 is a block diagram that illustrates an example infrastructure, in which one or more of the processes described herein, may be implemented, according to an embodiment.

FIG. 1 is a block diagram that illustrates an example system for automated conversion of client benefit plans, represented in various different and incompatible formats, into benefit packages that are compatible for use with a pharmacy benefit management platform, according to an embodiment. The infrastructure may comprise a PBM platform 110 (e.g., one or more servers) which hosts and/or executes one or more of the various functions, processes, methods, and/or software modules described herein. In an embodiment, platform 110 may comprise an integrated, flexible, adaptive, enterprise-grade, web-experience solution that provides functions for designing, building, validating, and/or managing benefit plans. Each benefit plan, managed by platform 110, may be represented as a data structure referred to herein as a "benefit package."

Platform 110 may comprise dedicated servers, or may instead comprise cloud instances, which utilize shared resources of one or more servers. These servers or cloud instances may be collocated and/or geographically distributed. Platform 110 may also comprise or be communicatively connected to a server application 112 and/or one or more databases 114. In addition, platform 110 may be communicatively connected to one or more user systems 130 via one or more networks 120. Platform 110 may also be communicatively connected to one or more external systems 140 (e.g., other platforms, websites, etc.) via one or more networks 120.

Network(s) 120 may comprise the Internet, and platform 110 may communicate with user system(s) 130 through the Internet using standard transmission protocols, such as HyperText Transfer Protocol (HTTP), HTTP Secure (HTTPS), File Transfer Protocol (FTP), FTP Secure (FTPS), Secure Shell FTP (SFTP), and the like, as well as proprietary protocols. While platform 110 is illustrated as being connected to various systems through a single set of network(s) 120, it should be understood that platform 110 may be connected to the various systems via different sets of one or more networks. For example, platform 110 may be connected to a subset of user systems 130 and/or external systems 140 via the Internet, but may be connected to one or more other user systems 130 and/or external systems 140 via an intranet. Furthermore, while only a few user systems 130 and external systems 140, one server application 112, and one set of database(s) 114 are illustrated, it should be understood that the infrastructure may comprise any number of user systems, external systems, server applications, and databases.

User system(s) 130 may comprise any type or types of computing devices capable of wired and/or wireless communication, including without limitation, desktop computers, laptop computers, tablet computers, smart phones or other mobile phones, servers, game consoles, televisions, set-top boxes, electronic kiosks, point-of-sale terminals, and/or the like. Each user system 130 may execute a client application 132, which may access a local database 134 in the memory of user system 130.

Platform 110 may comprise web servers which host one or more websites and/or web services. In embodiments in which a website is provided, the website may comprise a graphical user interface, including, for example, one or more screens (e.g., webpages) generated in HyperText Markup Language (HTML) or other language. Platform 110 transmits or serves one or more screens of the graphical user interface in response to requests from user system(s) 130. In some embodiments, these screens may be served in the form of a wizard, in which case two or more screens may be served in a sequential manner, and one or more of the sequential screens may depend on an interaction of the user or user system 130 with one or more preceding screens. The requests to platform 110 and the responses from platform 110, including the screens of the graphical user interface, may both be communicated through network(s) 120, which may include the Internet, using standard communication protocols (e.g., HTTP, HTTPS, etc.). These screens (e.g., webpages) may comprise a combination of content and elements, such as text, images, videos, animations, references (e.g., hyperlinks), frames, inputs (e.g., textboxes, text areas, checkboxes, radio buttons, drop-down menus, buttons, forms, etc.), scripts (e.g., JavaScript), and the like, including elements comprising or derived from data stored in one or more databases (e.g., database(s) 114) that are locally and/or remotely accessible to platform 110. Platform 110 may also respond to other requests from user system(s) 130.

Platform 110 may further comprise, be communicatively coupled with, or otherwise have access to one or more database(s) 114. For example, platform 110 may comprise one or more database servers which manage one or more databases 114. A user system 130 or server application 112 executing on platform 110 may submit data (e.g., user data, form data, etc.) to be stored in database(s) 114, and/or request access to data stored in database(s) 114. Any suitable database may be utilized, including without limitation Oracle™ (e.g., release 12c or above), MySQL™ IBM™, Microsoft SQL™, Access™, and the like, including cloud-based databases and proprietary databases. Data may be sent to platform 110, for instance, using the well-known POST request supported by HTTP, via FTP, and/or the like. This data, as well as other requests, may be handled, for example, by server-side web technology, such as a servlet or other software module (e.g., comprised in server application 112), executed by platform 110.

In embodiments in which a web service is provided, platform 110 may receive requests from external system(s) 140, and provide responses in eXtensible Markup Language (XML), JavaScript Object Notation (JSON), and/or any other suitable or desired format. In such embodiments, platform 110 may provide an application programming interface (API) which defines the manner in which user system(s) 130 and/or external system(s) 140 may interact with the web service. Thus, user system(s) 130 and/or external system(s) 140 (which may themselves be servers), can define their own user interfaces, and rely on the web service to implement or otherwise provide the backend processes, methods, functionality, storage, and/or the like, described herein. For example, in such an embodiment, a client application 132 executing on one or more user system(s) 130 may interact with a server application 112 executing on platform 110 to execute one or more or a portion of one or more of the various functions, processes, methods, and/or software modules described herein. Client application 132 may be "thin," in which case processing is primarily carried out server-side by server application 112 on platform 110. A basic example of a thin client application is a browser application, which simply requests, receives, and renders webpages at user system(s) 130, while the server application on platform 110 is responsible for generating the webpages and managing database functions. Alternatively, the client application may be "thick," in which case processing is primarily carried out client-side by user system(s) 130. It should be understood that client application 132 may perform an amount of processing, relative to server application 112 on platform 110, at any point along this spectrum between "thin" and "thick," depending on the design goals of the particular implementation. In any case, the application described herein, which may wholly reside on either platform 110 (e.g., in which case server application 112 performs substantially all processing) or user system(s) 130 (e.g., in which case client application 132 performs substantially all processing) or be distributed between platform 110 and user system(s) 130 (e.g., in which case server application 112 and client application 132 both perform substantial processing), can comprise one or more executable software modules that implement one or more of the functions, processes, or methods of the application described herein.

In an embodiment, platform 110 comprises one or more web servers and one or more application servers. In addition, platform 110 may comprise one or more load balancers between user systems 130 and the web servers and/or one or more load balancers between the web servers and the application servers. Each web server serves content (e.g., graphical user interfaces in the form of webpages) to user systems 130, whereas each application server provides the backend functionality to generate dynamic webpages, process data (e.g., executing the processes described herein), and interact with database(s) 114. In an embodiment, each web server is implemented using the Apache™ HTTP Server (e.g., release 2.x or above) executing on the Linux™ operating system, and each application server is implemented using Apache Tomcat Server (e.g., release 9.x or above) executing on the Linux™ operating system. However, it should be understood that other configurations are possible.

Platform 110 may implement well-known authentication and access-control techniques to authenticate users (e.g., using credentials, such as usernames and passwords, digital certificates, etc.), assign roles and/or permissions to those users, and ensure that only authenticated users are able to access resources on platform 110, and only according to their roles and/or permissions. For example, roles may include an administrator role (e.g., having access to all resources) and at least one non-administrator role (e.g., having access to non-administrative resources). Most users (e.g., CBAs) may be assigned a non-administrator role, which provides them with access to the primary functions described herein. Fewer users may be assigned an administrator role, which provides them, for example, with access to resources that alter the behavior of the primary functions described herein (e.g., by editing templates, including layouts and/or translation rules). In an embodiment, the Spring Security™ framework may be used to perform authentication. The application may also provide an appropriate graphical user interface for adding, editing, and deleting users, creating and updating user credentials, assigning and updating roles and/or permissions, and/or the like.

1.2. Example Processing Device

Figure 2:
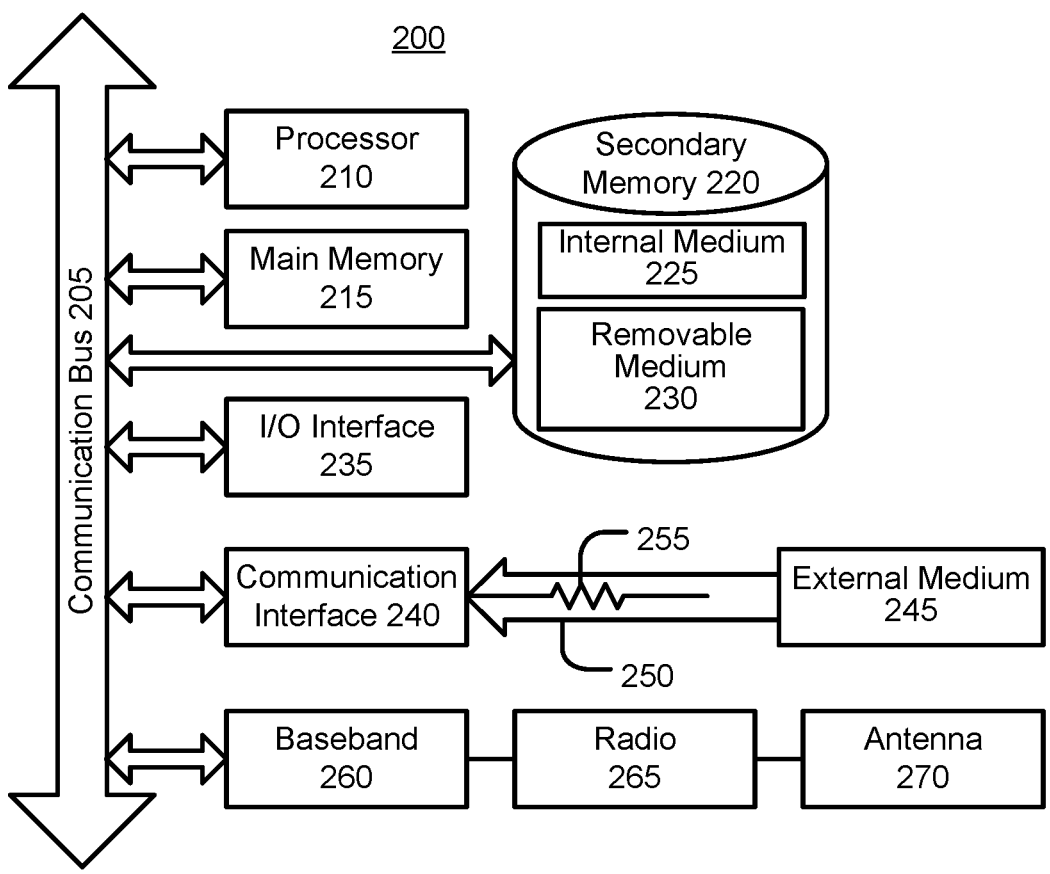
FIG. 2 is a block diagram that illustrates an example processing system, by which one or more of the processed described herein, may be executed, according to an embodiment.

FIG. 2 is a block diagram illustrating an example wired or wireless system 200 that may be used in connection with various embodiments described herein. For example, system 200 may be used as or in conjunction with one or more of the functions, processes, or methods (e.g., to store and/or execute the application or one or more software modules of the application) described herein, and may represent components of platform 110, user system(s) 130, external system(s) 140, and/or other processing devices described herein. System 200 can be a server or any conventional personal computer, or any other processor-enabled device that is capable of wired or wireless data communication. Other computer systems and/or architectures may be also used, as will be clear to those skilled in the art.

System 200 preferably includes one or more processors, such as processor 210. Additional processors may be provided, such as an auxiliary processor to manage input/output, an auxiliary processor to perform floating-point mathematical operations, a special-purpose microprocessor having an architecture suitable for fast execution of signal-processing algorithms (e.g., digital-signal processor), a slave processor subordinate to the main processing system (e.g., back-end processor), an additional microprocessor or controller for dual or multiple processor systems, and/or a coprocessor. Such auxiliary processors may be discrete processors or may be integrated with processor 210. Examples of processors which may be used with system 200 include, without limitation, the Pentium® processor, Core i7® processor, and Xeon® processor, all of which are available from Intel Corporation of Santa Clara, Calif.

Processor 210 is preferably connected to a communication bus 205. Communication bus 205 may include a data channel for facilitating information transfer between storage and other peripheral components of system 200. Furthermore, communication bus 205 may provide a set of signals used for communication with processor 210, including a data bus, address bus, and/or control bus (not shown). Communication bus 205 may comprise any standard or non-standard bus architecture such as, for example, bus architectures compliant with industry standard architecture (ISA), extended industry standard architecture (EISA), Micro Channel Architecture (MCA), peripheral component interconnect (PCI) local bus, standards promulgated by the Institute of Electrical and Electronics Engineers (IEEE) including IEEE 488 general-purpose interface bus (GPM), IEEE 696/S-100, and/or the like.

System 200 preferably includes a main memory 215 and may also include a secondary memory 220. Main memory 215 provides storage of instructions and data for programs executing on processor 210, such as one or more of the functions and/or modules discussed herein. It should be understood that programs stored in the memory and executed by processor 210 may be written and/or compiled according to any suitable language, including without limitation C/C++, Java, JavaScript, Perl, Visual Basic, .NET, and the like. Main memory 215 is typically semiconductor-based memory such as dynamic random access memory (DRAM) and/or static random access memory (SRAM). Other semiconductor-based memory types include, for example, synchronous dynamic random access memory (SDRAM), Rambus dynamic random access memory (RDRAM), ferroelectric random access memory (FRAM), and the like, including read only memory (ROM).

Secondary memory 220 may optionally include an internal medium 225 and/or a removable medium 230. Removable medium 230 is read from and/or written to in any well-known manner. Removable storage medium 230 may be, for example, a magnetic tape drive, a compact disc (CD) drive, a digital versatile disc (DVD) drive, other optical drive, a flash memory drive, and/or the like.

Secondary memory 220 is a non-transitory computer-readable medium having computer-executable code (e.g., disclosed software modules) and/or other data stored thereon. The computer software or data stored on secondary memory 220 is read into main memory 215 for execution by processor 210.

In alternative embodiments, secondary memory 220 may include other similar means for allowing computer programs or other data or instructions to be loaded into system 200. Such means may include, for example, a communication interface 240, which allows software and data to be transferred from external storage medium 245 to system 200. Examples of external storage medium 245 may include an external hard disk drive, an external optical drive, an external magneto-optical drive, and/or the like. Other examples of secondary memory 220 may include semiconductor-based memory, such as programmable read-only memory (PROM), erasable programmable read-only memory (EPROM), electrically erasable read-only memory (EEPROM), and flash memory (block-oriented memory similar to EEPROM).

As mentioned above, system 200 may include a communication interface 240. Communication interface 240 allows software and data to be transferred between system 200 and external devices (e.g. printers), networks, or other information sources. For example, computer software or executable code may be transferred to system 200 from a network server (e.g., platform 110) via communication interface 240. Examples of communication interface 240 include a built-in network adapter, network interface card (NIC), Personal Computer Memory Card International Association (PCMCIA) network card, card bus network adapter, wireless network adapter, Universal Serial Bus (USB) network adapter, modem, a wireless data card, a communications port, an infrared interface, an IEEE 1394 fire-wire, and any other device capable of interfacing system 200 with a network (e.g., network(s) 120) or another computing device. Communication interface 240 preferably implements industry-promulgated protocol standards, such as Ethernet IEEE 802 standards, Fiber Channel, digital subscriber line (DSL), asynchronous digital subscriber line (ADSL), frame relay, asynchronous transfer mode (ATM), integrated digital services network (ISDN), personal communications services (PCS), transmission control protocol/Internet protocol (TCP/IP), serial line Internet protocol/point to point protocol (SLIP/PPP), and so on, but may also implement customized or non-standard interface protocols as well.

Software and data transferred via communication interface 240 are generally in the form of electrical communication signals 255. These signals 255 may be provided to communication interface 240 via a communication channel 250. In an embodiment, communication channel 250 may be a wired or wireless network (e.g., network(s) 120), or any variety of other communication links. Communication channel 250 carries signals 255 and can be implemented using a variety of wired or wireless communication means including wire or cable, fiber optics, conventional phone line, cellular phone link, wireless data communication link, radio frequency ("RF") link, or infrared link, just to name a few.

Computer-executable code (e.g., computer programs, such as the disclosed application, or software modules) is stored in main memory 215 and/or secondary memory 220. Computer programs can also be received via communication interface 240 and stored in main memory 215 and/or secondary memory 220. Such computer programs, when executed, enable system 200 to perform the various functions of the disclosed embodiments as described elsewhere herein.

In this description, the term "computer-readable medium" is used to refer to any non-transitory computer-readable storage media used to provide computer-executable code and/or other data to or within system 200. Examples of such media include main memory 215, secondary memory 220 (including internal memory 225, removable medium 230, and external storage medium 245), and any peripheral device communicatively coupled with communication interface 240 (including a network information server or other network device). These non-transitory computer-readable media are means for providing executable code, programming instructions, software, and/or other data to system 200.

In an embodiment that is implemented using software, the software may be stored on a computer-readable medium and loaded into system 200 by way of removable medium 230, I/O interface 235, or communication interface 240. In such an embodiment, the software is loaded into system 200 in the form of electrical communication signals 255. The software, when executed by processor 210, preferably causes processor 210 to perform one or more of the processes and functions described elsewhere herein.

In an embodiment, I/O interface 235 provides an interface between one or more components of system 200 and one or more input and/or output devices. Example input devices include, without limitation, sensors, keyboards, touch screens or other touch-sensitive devices, biometric sensing devices, computer mice, trackballs, pen-based pointing devices, and/or the like. Examples of output devices include, without limitation, other processing devices, cathode ray tubes (CRTs), plasma displays, light-emitting diode (LED) displays, liquid crystal displays (LCDs), printers, vacuum fluorescent displays (VFDs), surface-conduction electron-emitter displays (SEDs), field emission displays (FEDs), and/or the like. In some cases, an input and output device may be combined, such as in the case of a touch panel display (e.g., in a smartphone, tablet, or other mobile device).

System 200 may also include optional wireless communication components that facilitate wireless communication over a voice network and/or a data network (e.g., in the case of user system 130). The wireless communication components comprise an antenna system 270, a radio system 265, and a baseband system 260. In system 200, radio frequency (RF) signals are transmitted and received over the air by antenna system 270 under the management of radio system 265.

In an embodiment, antenna system 270 may comprise one or more antennae and one or more multiplexors (not shown) that perform a switching function to provide antenna system 270 with transmit and receive signal paths. In the receive path, received RF signals can be coupled from a multiplexor to a low noise amplifier (not shown) that amplifies the received RF signal and sends the amplified signal to radio system 265.

In an alternative embodiment, radio system 265 may comprise one or more radios that are configured to communicate over various frequencies. In an embodiment, radio system 265 may combine a demodulator (not shown) and modulator (not shown) in one integrated circuit (IC). The demodulator and modulator can also be separate components. In the incoming path, the demodulator strips away the RF carrier signal leaving a baseband receive audio signal, which is sent from radio system 265 to baseband system 260.

If the received signal contains audio information, then baseband system 260 decodes the signal and converts it to an analog signal. Then the signal is amplified and sent to a speaker. Baseband system 260 also receives analog audio signals from a microphone. These analog audio signals are converted to digital signals and encoded by baseband system 260. Baseband system 260 also encodes the digital signals for transmission and generates a baseband transmit audio signal that is routed to the modulator portion of radio system 265. The modulator mixes the baseband transmit audio signal with an RF carrier signal, generating an RF transmit signal that is routed to antenna system 270 and may pass through a power amplifier (not shown). The power amplifier amplifies the RF transmit signal and routes it to antenna system 270, where the signal is switched to the antenna port for transmission.

Baseband system 260 is also communicatively coupled with processor 210, which may be a central processing unit (CPU). Processor 210 has access to data storage areas 215 and 220. Processor 210 is preferably configured to execute instructions (i.e., computer programs, such as the disclosed application, or software modules) that can be stored in main memory 215 or secondary memory 220. Computer programs can also be received from baseband processor 260 and stored in main memory 210 or in secondary memory 220, or executed upon receipt. Such computer programs, when executed, enable system 200 to perform the various functions of the disclosed embodiments.

1.3. Benefit Packages

Figure 3:
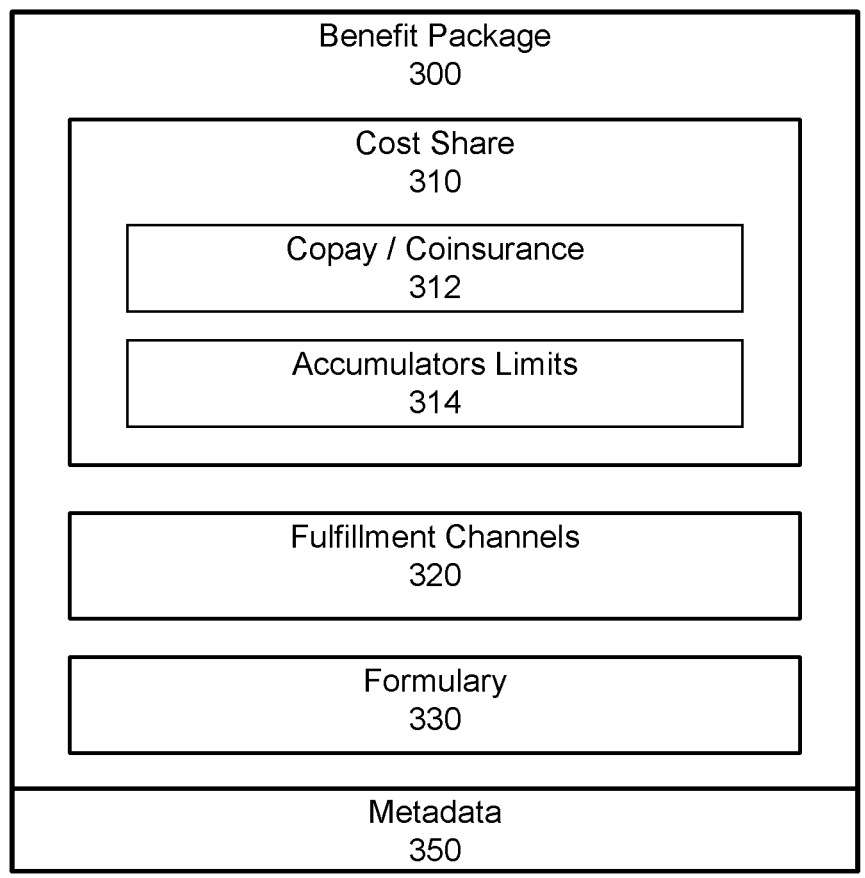
FIG. 3 is a block diagram that illustrates an example benefit package, according to an embodiment.

In an embodiment, each benefit plan is represented on platform 110 as a benefit package. FIG. 3 is a block diagram that illustrates an example benefit package 300, according to an embodiment. In general, each benefit package 300 should comprise data sufficient to determine what drugs are covered by the benefit plan (e.g., drug lists and utilization management (UM) rules), where drugs can be fulfilled under the benefit plan (e.g., pharmacy networks), and the cost for each drug (e.g., member's cost share and network pricing). Thus, in the illustrated embodiment, benefit package 300 is a data structure that comprises or is associated with a cost share 310, fulfillment channels 320, and a formulary 330. Each benefit package 300 may be stored in a relational database (e.g., in database 114) to ensure that all content is kept in a standard format that can be accessed either inside or outside of platform 110. In addition, benefit packages 300 should be maintained in the database separately from any presentation elements, so that benefit packages 300 may be rendered in multiple formats and according to different device requirements.

In an embodiment, cost share 310 is a data structure that comprises or is associated with a copay and/or coinsurance 312 and accumulators limits 314 for benefit package 300. For example, copay and/or coinsurance 312 may indicate one or more tiers that apply to benefit package 300 and minimums and/or maximum copay amounts for each tier. Accumulators limits 314 may indicate each deductible limit and/or out-of-pocket limit that applies to benefit package 300.

In an embodiment, fulfillment channels 320 is a data structure that indicates one or more fulfillment channels that are provided by benefit package 300. Each fulfillment channel may comprise pharmacies (e.g., chains) and the associated network pricing for those pharmacies. The fulfillment channels may comprise a retail channel, a mail-order channel, and/or other fulfillment channels. One or more of the fulfillment channels may also be provided in a plurality of types. For example, the retail channel may be provided in retail, specialty, choice, and/or other types.

In an embodiment, formulary 330 is a data structure that represents the formulary used by benefit package. Formulary 330 may comprise or be associated with one or a plurality of drug lists and indicate whether each drug list is open or closed and/or the UM rules that apply to the drug list. UM rules may comprise, for example, a prior authorization requirement, step therapy requirements, quantity supply restrictions, age restrictions, and/or the like.

In an embodiment, each benefit package 300 is associated with metadata 350 to ensure data integrity, traceability, and/or security. Examples of such metadata include, without limitation, a global unique identifier (GUID), a label and description for branching, a creation timestamp indicating when benefit package 300 was created, a creator indicating a user of platform 110 that created benefit package 300, a modification timestamp indicating at least the most recent time that benefit package 300 was modified, a modifier indicating at least a user of platform 110 who performed the most recent modification to benefit package 300, a path of benefit package 300 within a content hierarchy, an approval status of benefit package 300, a publication status of benefit package 300, a scheduled publication timestamp indicating a time at which benefit package 300 will be published (e.g., activated in a production environment) or a scheduled un-publication timestamp indicating a time at which benefit package 300 will be un-published (e.g., deactivated from the production environment), last published timestamp indicating when benefit package 300 was most recently published, last un-published timestamp indicating when benefit package 300 was most recently un-published, and/or security-related information (e.g., an access control list).

1.4. Templates

Figure 4:
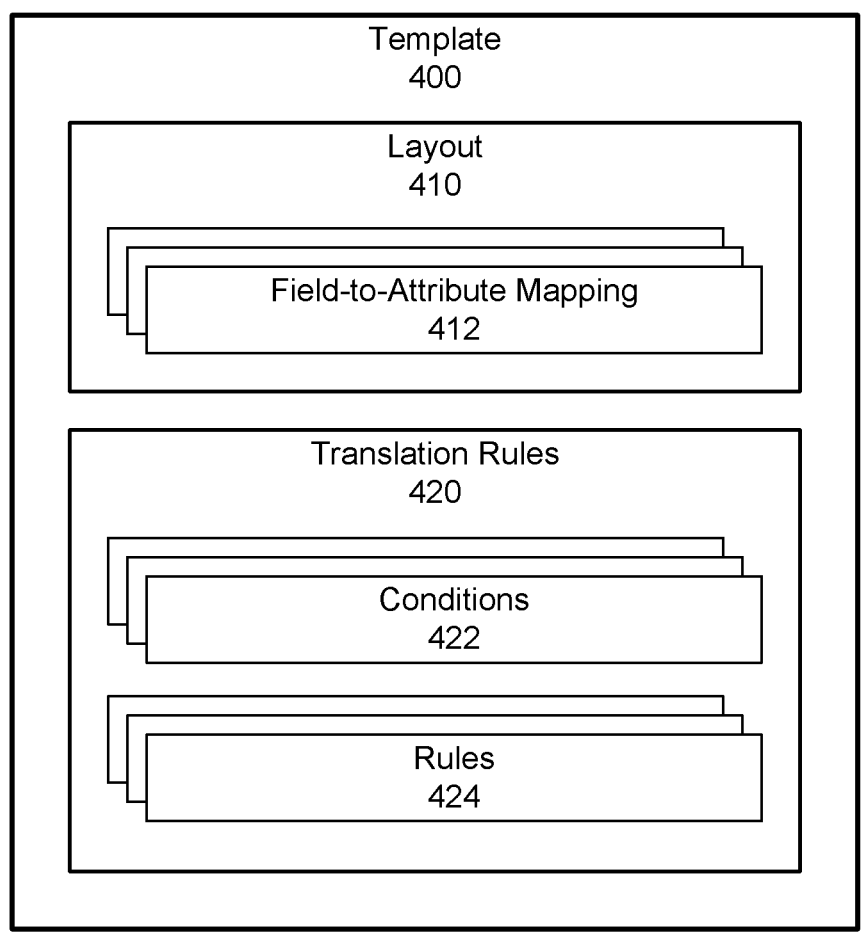
FIG. 4 is a block diagram that illustrates an example template, according to an embodiment.

In an embodiment, platform 110 provides a plurality of templates to be used for the automated generation of benefit packages 300. FIG. 4 is a block diagram that illustrates an example template 400, according to an embodiment. In the illustrated embodiment, template 400 is a data structure that comprises or is associated with a layout 410 and transition rules 420.

In an embodiment, layout 410 comprises one or more—and generally a plurality of—field-to-attribute mappings 412. Each field-to-attribute mapping 412 maps one or more fields in a client file into an attribute to be used by translation rules 420. Layout 410 may also be used to validate the client file. For example, if all field-to-attribute mappings 412 are successfully applied to the client file, the client file may be determined to be valid. On the other hand, if an error or other problem occurs when applying a field-to-attribute mapping 412 to a particular field (e.g., due to a mismatched data type that occurs, for example, when the field-to-attribute mapping 412 expects, but does not find, a particular data type, such as an integer, in a field of the client file), the client file may be determined to be invalid, and an error, warning, or other indication may be notified to a user.

In an embodiment, translation rules 420 comprise one or more conditions 422 and one or more rules 424. Typically, translation rules 420 will comprise a plurality of conditions 422, as well as a plurality of rules 424. Each condition 422 represents a condition that may be utilized by a rule 424. In other words, each rule 424 may utilize one or more conditions 422 (e.g., by reference to condition(s) 422).

In an embodiment, each condition 422 specifies a comparison operator and two expressions to be compared. Examples of comparison operators include, without limitation, "contains" to determine whether or not the first expression contains the second expression, "equals" to determine whether or not the first expression equals the second expression, "greater than" to determine whether or not the first expression is greater than the second expression, "less than" to determine whether or not the first expression is less than the second expression, "like" to determine whether or not the first expression matches a pattern specified in the second expression, and/or the like. One or both of the expressions may include the value of an attribute (i.e., mapped from fields in the client file according to layout 410), a mathematical formula or other operation that utilizes values of one or more attributes, a constant value, a regular expression, and/or the like, as well as combinations of attribute values, mathematical formulae or other operations, constant values, regular expressions, and/or the like.

In an embodiment, each rule 424 translates one or more attributes, derived from the fields of the client file according to layout 410, into a component of a benefit package 300. As mentioned above, a rule 424 may reference one or more of conditions 422 to output a component of benefit package 300 based on the comparison represented by the referenced condition(s) 422. For example, one or more rules 424 may output one or more fulfillment channels 320 based on whether the attribute for the formulary status contains the term "open" or "closed."

In an embodiment, a rule 424 may combine one or more attribute values to produce a unique identifier or code for a particular component to be used in benefit package 300. For example, a rule 424 may combine a plurality of attribute values related to the formulary (e.g., status, number of tiers, etc.), optionally with a predetermined or dynamically determined prefix and/or suffix, into a string of alpha, numeric, or alphanumeric characters, representing a key that uniquely identifies the formulary 330 to be used. Thus, advantageously, the particular formulary 330 to be used in benefit package 300 can be quickly and efficiently identified and retrieved. In addition, if the character string fails to match the key of any existing formulary, provided by platform 110, a new formulary can be automatically generated with those particular attributes, or a new formulary shell can be automatically generated to be manually completed at a later time (e.g., by a CBA). In other words, certain components of benefit package 300, such as formulary 330, may be uniquely identified as a character string comprising two or more of its attribute values.

While template 400 is illustrated as a single data structure, layout 410 and translation rules 420 do not need to be persistently associated. For example, a plurality of layouts 410 may be individually stored and retrievable, and a plurality of translation rules 420 may also be individually stored and retrievable, separately from the layouts 410. In this case, any one of the plurality of layouts 410 can be matched with any one of the translation rules 420 (e.g., by a user via drop-down or other menus in a graphical user interface of the application), at or before the time of translation, to generate a client-specific or file-specific template 400 for translation of a client file. Alternatively, a specific one of the layouts 410 may be persistently paired with a specific one of the translation rules 420 in a persistent template 400 to be used repeatedly for a particular client or client file.

In an embodiment, templates 400, including their respective layout 410, translation rules 420, and their various sub-components, may be edited via a graphical user interface of the application. Specifically, the graphical user interface may comprise one or more screens by which an authenticated user with an administrative role may edit one or more templates 400 within that user's permissions. The screen(s) may comprise inputs for searching templates 400 (e.g., by inputting keywords into a search textbox), updating information about each template 400 (e.g., template name, label, description, type, tier structure, pivot, type of client file, starting row in the client file from which to read field values, the number or other identifier of a worksheet within the client file from which to read field values, etc.), adding, editing, and/or deleting templates 400, updating definitions for each template 400, such as adding, editing, and/or deleting field-to-attribute mappings 412, conditions 422, and/or rules 424, and/or the like.

2. Process Overview

Embodiments of processes for automated conversion of client benefit plans, represented in various different and incompatible formats, into benefit packages that are compatible for use with a pharmacy benefit management platform, will now be described in detail. It should be understood that the described processes may be embodied in one or more software modules that are executed by one or more hardware processors (e.g., processor 210), e.g., as the application discussed herein (e.g., server application 112, client application 132, and/or a distributed application comprising both server application 112 and client application 132), which may be executed wholly by processor(s) of platform 110, wholly by processor(s) of user system(s) 130, or may be distributed across platform 110 and user system(s) 130, such that some portions or modules of the application are executed by platform 110 and other portions or modules of the application are executed by user system(s) 130. The described process may be implemented as instructions represented in source code, object code, and/or machine code. These instructions may be executed directly by the hardware processor(s), or alternatively, may be executed by a virtual machine (e.g., Java virtual machine) operating between the object code and the hardware processors. In addition, the disclosed application may be built upon or interfaced with one or more existing systems.

Alternatively, the described processes may be implemented as a hardware component (e.g., general-purpose processor, integrated circuit (IC), application-specific integrated circuit (ASIC), digital signal processor (DSP), field-programmable gate array (FPGA) or other programmable logic device, discrete gate or transistor logic, etc.), combination of hardware components, or combination of hardware and software components. To clearly illustrate the interchangeability of hardware and software, various illustrative components, blocks, modules, circuits, and steps are described herein generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the invention. In addition, the grouping of functions within a component, block, module, circuit, or step is for ease of description. Specific functions or steps can be moved from one component, block, module, circuit, or step to another without departing from the invention.

2.1. Example Conversion Overview

Figure 5:
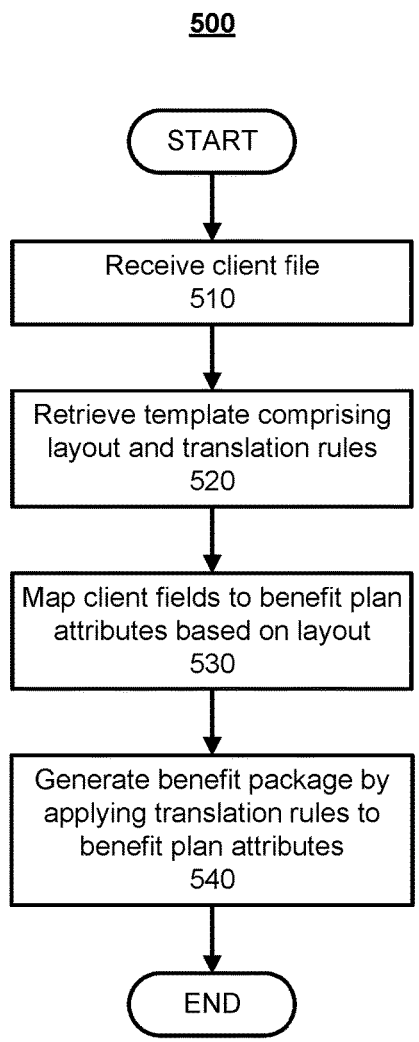
FIG. 5 is a flowchart that illustrates an example process for automated conversion of client benefit plans, represented in various different and incompatible formats, into benefit packages that are compatible for use with a pharmacy benefit management platform, according to an embodiment.

FIG. 5 illustrates an example process 500 for automated conversion of client benefit plans, represented in various different and incompatible formats, into benefit packages that are compatible for use with a pharmacy benefit management platform, according to an embodiment. While process 500 is illustrated with a certain arrangement and ordering of steps, process 500 may be implemented with fewer, more, or different steps and a different arrangement and/or ordering of steps.

Process 500 may be implemented by the disclosed application (e.g., server application 112) as a software module for generating new benefit packages 300 or modifying or otherwise updating existing benefit packages 300 (e.g., in response to a benefit change request) to be used for testing and/or claim adjudication (e.g., by platform 110). Advantageously, process 500 may be performed on a plurality of client files, which may represent benefit plans in any number of different formats, to standardize the representations of those benefit plans into a single format for use on platform 110 (e.g., within a claim adjudication process, within a testing environment, etc.) and/or elsewhere (e.g., exported to an external system 140).

In step 510, the application receives a client file. In an embodiment, the client file is uploaded by a user (e.g., CBA) from client application 132 (e.g., a web browser) on user system 130 to server application 112. Specifically, server application 112 may serve a graphical user interface to be rendered by client application 132. The graphical user interface may comprise one or more inputs for uploading the client file (e.g., an input for browsing a file system of a user system 130 and selecting a file, and optionally an input for selecting a file type for the client file), entering request information (e.g., a case number for customer relationship management, such as a Salesforce™ case number), and/or initiating the translation of the client file into a benefit package 300 that may be utilized in subsequent processes. In the same or similar manner, the application may also enable client files to be uploaded in batches of two or more client files at a time (e.g., by providing one or more inputs in the graphical user interface by which the user can select multiple client files to be uploaded, and optionally an input for selecting a file type of each client file).

In an alternative or additional embodiment, an individual client file or a batch of client files may be communicated to the server application 112 by an external system 140 of the client or an intermediary between platform 110 and the client's external system 140. For example, the client may utilize a client-specific external system 140 to automatically establish a connection with platform 110 over network(s) 120, and transmit a request, including one or more client files, to server application 112 over network(s) 120.

In step 520, the application retrieves a template 400, comprising a layout 410 and translation rules 420. In an embodiment, the template 400 is selected by the user via a graphical user interface generated and served by server application 112. The selection of template 400 may comprise the selection of a template 400 that persistently associates a layout 410 with translation rules 420. Alternatively, the selection of template 400 may comprise a first selection of one of a plurality of layouts 410 (e.g., from a first drop-down list in the graphical user interface) and, separately, a second selection of one of a plurality of translation rules 420 (e.g., from a second drop-down list in the graphical user interface).

In an alternative or additional embodiment, the template 400 may be automatically selected by the application. For example, server application 112 may analyze the client file and/or the request information submitted with the client file (e.g., by a user or client-specific external system), and automatically determine the template 400 to be used with the client file based on that analysis.

In step 530, the application maps client fields to benefit plan attributes based on layout 410 of template 400. In an embodiment, layout 410 comprises field-to-attribute mappings 412 between fields in the client file to internal attributes used by server application 112 to build each benefit package 300. For example, the client file may comprise a spreadsheet with rows and columns of values. It should be understood that any such spreadsheet can be represented in a file having the native format of the software (e.g., Excel™) that was used to create and/or edit the file, as well as in a CSV file. Each row may represent one entire benefit plan, in which case each column represents one field value for each benefit plan. Alternatively, each column may represent one entire benefit plan, in which case each row represents one field value for each benefit plan. As another alternative, each benefit plan could be represented by a plurality of linked rows (e.g., linked by a shared field value in one column) that each represent one or more field values for the benefit plan. In any case, the client file specifies a plurality of field values for each of one or more benefit plans. For each benefit plan, represented in the client file, field-to-attribute mappings 412 of layout 410 maps the field values for that benefit plan to attribute values that will be used to construct a benefit package 300 for that benefit plan. Any given field-to-attribute mappings 412 in layout 410 may represent a mapping of one field value to one attribute value, two or more field values to one attribute value, one field value to two or more attributes values, or two or more field values to two or more attribute values. Layout 410 may also specify default attribute values for one or more of the attributes. The default value for an attribute value may be automatically used for that attribute when the field value(s) for that attribute are not specified in the client file and/or are invalid.

Examples of field values which may be comprised in a client file include, without limitation, headquarters identifier, product lifecycle management (PLM) identifier (e.g., Windchill™ identifier), vendor code (e.g., identifying the client), benefit start date, benefit term date, tiers (e.g., number of tiers, code representing a particular tier structure, etc.), formulary status (e.g., open or closed), state in which the benefit plan will be used, market, fully-insured or self-insured, exchange (e.g., on or off), metallic tier (e.g., bronze, silver, gold), benefit coverage type (e.g., standard, high-deductible health plan (HDHP), enhanced, limited prescription, no prescription, etc.), reset period (e.g., plan or calendar), prescription-only member deductible, prescription-only family deductible, member prescription and medical deductible, family prescription and medical deductible, aggregate or embedded deductible, member out-of-pocket limit, family out-of-pocket limit, member prescription and medical out-of-pocket limit, family prescription and medical out-of-pocket limit, aggregate or embedded out-of-pocket limit, health savings account (HSA) preventative status (e.g., yes or no), oral chemotherapy mandate status, women's preventative care/contraceptives status, Affordable Care Act (ACA) mandates status, benefit minimum/maximum status, prescription-only deductible status, infertility maximum status/amount, diabetic mandate status, and/or the like. In addition, for each tier in the represented benefit plan, the field values may include, without limitation, retail copay amount, copay roll-up amount for maximum out-of-pocket limit, minimum and/or maximum coinsurance percentage, minimum and/or maximum copay per prescription per one or more time ranges (e.g., 0-30 days, 31-60 days, and 61-90 days), minimum and/or maximum out-of-pocket coinsurance percentage, whether or not to apply a retail deduction, and/or the like.

In an embodiment of step 530, the application may validate the client file based on layout 410. Specifically, the application may verify that the fields in the client file properly map to the expected attributes in field-to-attribute mappings 412. For example, one field-to-attribute mapping 412 may map a copay field value to a copay attribute value. When applying this field-to-attribute mapping 412 to the client file, if the application encounters a letter string in the copay field value, instead of an integer or decimal number representing a dollar amount, the application may provide a warning, error, or other indication. This indication may be provided to an appropriate user via the graphical user interface generated by the application. On the other hand, if no unexpected field values are encountered in the client file and/or no other issues are encountered during step 530, the application may provide an indication that the client file was validated (e.g., via the graphical user interface).

In step 540, the application generates a benefit package 300 by applying translation rules 420 to the benefit plan attributes obtained in step 530. Specifically, for each benefit plan represented in the client file, the attribute values, obtained from the field values in step 530, are provided as inputs to translation rules 420 to generate the cost share 310, fulfillment channels 320, and formulary 330 of a benefit package 300. These attribute values may also be utilized to generate metadata 350 for the benefit package 300.

In an embodiment, the application may seek confirmation from a user to proceed to step 540 after completing step 530. For example, if the client file is not successfully validated in step 530, the application may generate or update the graphical user interface to notify the user that the client file was not validated and prompt the user to correct the problem. Otherwise, if the client file was successfully validated in step 530, the application may generate or update the graphical user interface to notify the user that the client file was validated and/or include an input for initiating the translation of step 540. Alternatively, the application may automatically proceed from step 530 to step 540 (i.e., without manual confirmation or other user input) whenever the client file is validated in step 530.

In an embodiment, after a benefit package 300 has been generated (e.g., via process 500), the benefit package 300 may be updated at any point in the future via a graphical user interface of the application. For example, the graphical user interface may comprise one or more screens for editing the various components of the benefit package 300, such as cost share 310, fulfillment channels 320, and/or formulary 330, and/or their sub-components.

2.2. Example Application of Translation Rules

Figure 6:
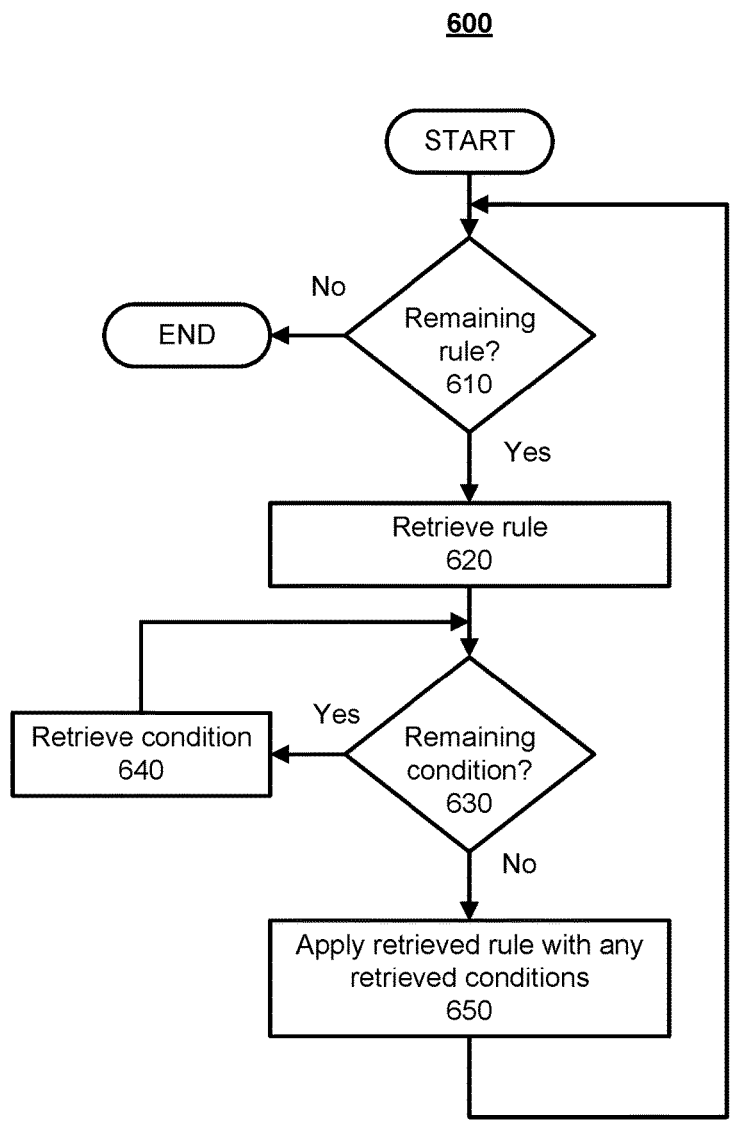
FIG. 6 is a flowchart that illustrates an example process for applying translation rules, according to an embodiment.

FIG. 6 illustrates an example process 600 for applying translation rules 420, according to an embodiment. While process 600 is illustrated with a certain arrangement and ordering of steps, process 600 may be implemented with fewer, more, or different steps and a different arrangement and/or ordering of steps. Process 600 may be implemented by the disclosed application (e.g., server application 112) as part of step 540 of process 500.

In step 610, the application determines whether or not any rules 424 remain to be applied from the translation rules 420 being applied (e.g., as part of step 540). If a rule 424 remains to be applied (i.e., "Yes" in step 610), in step 620, the application retrieves the next rule 424 to be applied from the translation rules 420. Otherwise, if all rules 424 have been applied from the translation rules 420 (i.e., "No" in step 610), process 600 ends. In other words, the application, implementing process 600, retrieves and applies each of the rules 424 included in the translation rules 420 being applied in step 540 of process 500.

In step 630, the application parses the current rule 424 to determine whether or not it references any conditions 422. A rule may reference one or a plurality of conditions 422. If a condition 422 remains to be considered (i.e., "Yes" in step 630), the application retrieves that condition 422 in step 640. In other words, each condition 422 that is referenced in the current rule 424 is retrieved and evaluated. Once all conditions have been retrieved and/or evaluated (i.e., "No" in step 630), process 600 proceeds to step 650.

In step 650, the application applies the current rule 424, retrieved in step 620, according to the evaluated condition(s) 422, if any, retrieved in one or more iterations of step 640. As discussed elsewhere herein, each condition 422 may comprise at least one comparison of two or more expressions that are evaluated to produce a binary result (e.g., a Boolean operation that evaluates to either true or false). Each expression may comprise or reference attribute values obtained in step 530 of process 500, constant values, and/or other data values, and may comprise mathematical operators, string operators, and/or other types of operators that operate on those values. Any condition 422, referenced by the current rule 424, is evaluated, and the current rule 424 is applied in accordance with the result of that evaluated condition 422. In an embodiment, the application of each rule 424 may produce a data structure representing a component (e.g., cost share 310, fulfillment channels 320, formulary 330, or a component thereof) of the benefit package 300 generated in step 540 of process 500.

It should be understood that not all of rules 424 may necessarily be applied to produce a component of the benefit package 300. For example, if the condition(s) 422, referenced by a particular rule 424, evaluate to false, that rule 424 would not be applied. In an embodiment, a plurality of rules 424, each with different conditions 422, may each produce the same component when applied. However, in a typical implementation only one of those plurality of rules 424 would reference condition(s) 422 that evaluate to true for a given benefit package 300 (i.e., so as to be applied for that benefit package 300). Each of the other plurality of rules 424 would reference condition(s) 422 that evaluate to false (i.e., so as to not be applied for the benefit package 300). In other words, the condition(s) 424 for the set of rules 424, corresponding to a particular component, may be mutually exclusive. In this manner, the rules 422 can guarantee that only one instance of a particular component is generated for a given benefit package 300.

2.3. Example Rule

FIG. 7 illustrates an example process 700 for applying an example rule 424 to produce a component of the benefit package 300 generated in step 540 of process 500, according to an embodiment. While process 700 is illustrated with a certain arrangement and ordering of steps, process 700 may be implemented with fewer, more, or different steps and a different arrangement and/or ordering of steps. Process 700 may be implemented by the disclosed application (e.g., server application 112) as part of at least some iterations of step 650 of process 600.

In an embodiment, process 700 is utilized to quickly and efficiently retrieve the formulary 330 to be used in the benefit package 300 generated in step 540 of process 500. Specifically, instead of having to evaluate attribute values to determine and create the appropriate formulary 330 to be used for a given benefit plan, which may be computationally expensive, one or more attribute values may be combined to produce a key that can be used to retrieve an existing formulary 330. In addition, if no formulary currently exists for a produced key, the formulary or a shell for the formulary may be automatically generated for subsequent retrieval (e.g., in a future process 700 for a client file from the same or different client).

In step 710, the key is initialized. For example, an empty string buffer may be allocated for the key, and substrings may be inserted into or appended to the string buffer to produce the key. However, any suitable means for producing a string may be employed to produce the key in process 700.

In step 720, the application determines whether or not another attribute is to be added to the key pursuant to the current rule 424 being applied in step 650. If another attribute remains to be added to the key (i.e., "Yes" in step 720), in step 730, the application adds the value for that attribute to the key (e.g., using string concatenation). Otherwise, if all attributes have been added to the key (i.e., "No" in step 720), process 700 proceeds towards step 760. It should be understood that the attribute values may be incorporated into the key in a predefined sequence or order.

In optional step 740, the application may add a prefix value to the key (i.e., appended to the front of the key). Similarly, in optional step 750, the application may add a suffix value to the key (i.e., appended to the end of the key). It should be understood that process 700 may comprise neither step 740 nor step 750, step 740 without step 750, step 750 without step 740, or both steps 740 and 750. In addition, step 740 may be performed before step 720 while step 750 is performed after step 730 (or not at all), step 750 may be performed before step 720 while step 740 is performed after step 730 (or not at all), or both steps 740 and 750 may be performed before step 720. In embodiments which comprise step 740, the prefix may be a system-wide constant, or may be client-specific, user-specific, plan-specific, attribute-based, and/or the like. Similarly, in embodiments which comprise step 750, the suffix may be a system-wide constant, or may be client-specific, user-specific, plan-specific, attribute-based and/or the like.

In step 760, the key, consisting of the attribute value(s) added in one or more iterations of step 730, and optionally a prefix and/or suffix, is used to attempt to retrieve an existing component (e.g., an existing formulary 330). For example, the application may use the key as an index into a database (e.g., a table in database(s) 114) that stores representations of such components (e.g., existing formularies 330). If no existing component is retrieved using the key (i.e., "No" in step 760), process 700 proceeds to step 770. Otherwise, if an existing component is successfully retrieved using the key (i.e., "Yes" in step 760), process 700 proceeds to step 780.

In step 770, since the component does not yet exist (e.g., in database(s) 114), the application automatically generates the component or a shell of the component. Specifically, the application may generate the data structure for the component, and may either specify the data defining the component (e.g., values for attributes of the component) in the data structure or provide an initialized data structure to be defined at a later time (e.g., manually in the future by a CBA). In an embodiment or instance in which the component is automatically defined by the application, the application may define the component based on attribute values for the benefit plan and/or other data. In an embodiment or instance in which a shell of the component is generated, the application may notify a user (e.g., CBA) that the data structure was created, to thereby prompt the user to define the component by providing the necessary data (e.g., via one or more inputs of a graphical user interface generated by the application). In either case, the data structure, representing the component may be stored in database(s) 114 with existing components of the same type. For example, in the event that the component is a formulary 330, the newly generated formulary 330—whether fully defined, partially defined, or undefined—is stored in database(s) 114 with other existing formularies 330 for future retrieval (e.g., for another benefit plan for the same client or a different client, and/or, if not fully defined, to be fully defined by a user at a later time).

In step 780, the component, which is either an existing component retrieved in step 760 or a new component generated in step 770, is added to the benefit package 300 being generated in step 540 of process 500. Again, in the event that the component is a formulary 330, the formulary 330 may be added to the benefit package 300.

2.4. Example Claim Adjudication

In an embodiment, each benefit package 300 generated by disclosed embodiments can be utilized in claim adjudication. Platform 110 may comprise both a quality-control environment and a production environment. Before being published (e.g., activated) in a production environment, a benefit package 300 may be activated in the quality-control environment of platform 110, and test adjudications may be automatically or manually provided to the quality-control environment to ensure that claim adjudications, according to benefit package 300, behave in the expected manner. After testing or even without testing, benefit package 300 may be published (e.g., activated) in a production environment of platform 110, such that actual claims may be adjudicated by platform 110 according to benefit package 300. As discussed elsewhere herein, benefit packages 300 may also be un-published (e.g., deactivated) from the production environment of platform 110.

Each external system 140 may represent a claim system for a pharmacy. A pharmacy can be a brick-and-mortar store, an online ecommerce website or application, or any other entity that is capable of handling a prescription drug purchase transaction for a member of a benefit plan. In an embodiment, network(s) 120 include a switch (not shown) that operates in the communication infrastructure between external system 140 of the pharmacy and platform 110, and serves to electronically route prescription drug purchase claims to the appropriate PBM company based on member-provided information (e.g., a benefit plan card, or other eligibility data or evidence of coverage).

In operation, a member of a benefit plan attempts to purchase a prescribed drug at the pharmacy. The pharmacy collects certain information from the member to validate the prescription drug purchase transaction (also referred to herein as a "claim"). For example, this information may be obtained from the member's prescription drug benefits program card or other benefit plan card. The pharmacy system 140 sends an electronic claim adjudication request to platform 110 via network(s) 120. The claim adjudication request seeks approval of the drug purchase transaction from platform 110. Server application 112 of platform 110 retrieves the benefit package 300 associated with the member's benefit plan (e.g., identified in the claim adjudication request), and adjudicates the claim, based on the request and retrieved benefit package 300, to validate or determine various elements related to the claim. For example, these elements may include, without limitation, enrollment status of the member in the benefit plan, other member information, inclusion of the drug to be purchased on the formulary of the benefit plan, the quantity of the drug to be purchased (e.g., as limited by the utilization management rules of the formulary), the amount of the member's co-pay (e.g., as determined by consultation of the formulary), benefit design, pharmacy network, other restrictions imposed by the utilization management rules of the formulary, and/or the like.

During claim adjudication, platform 110 analyzes information relevant to the particular claim being adjudicated in association with the associated benefit package 300. During the analysis, platform 110 determines, at least in part based on the formulary 330 associated with benefit package 300, whether the claim will be denied or approved. If the claim will be approved, platform 110 may further utilize formulary 330 to determine the tier at which the claim will be adjudicated. If the claim will be denied, in some embodiments, platform 110 may determine if the tier level will be overridden. Upon completion of the claim adjudication process, platform 110 provides the results of the claim adjudication to the pharmacy system 140 in response to the claim adjudication request.

Embodiments disclosed herein may be used to generate a benefit package 300 to be used for claim adjudication for prescription drug benefits programs. It should be understood that the disclosed embodiments may be used in conjunction with any claims adjudication process or system. For instance, the disclosed embodiments may be used in conjunction with embodiments disclosed in one or any combination of U.S. patent application Ser. No. 12/913,685, filed on Oct. 27, 2010, U.S. patent application Ser. No. 13/207,203, filed on Aug. 10, 2011, U.S. patent application Ser. No. 13/612,586, filed on Sep. 12, 2012, and U.S. patent application Ser. No. 13/624,658, filed on Sep. 21, 2012—the entireties of all of which are hereby incorporated herein by reference as if set forth in full.

The above description of the disclosed embodiments is provided to enable any person skilled in the art to make or use the invention. Various modifications to these embodiments will be readily apparent to those skilled in the art, and the general principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly not limited.

Combinations, described herein, such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, and any such combination may contain one or more members of its constituents A, B, and/or C. For example, a combination of A and B may comprise one A and multiple B's, multiple A's and one B, or multiple A's and multiple B's.

What is claimed is:

1. A method comprising using at least one hardware processor to:
   receive one or more client files, wherein each of the one or more client files comprises one or more representations of a benefit plan, and wherein each of the one or more representations of a benefit plan comprises a plurality of field values; and, for each of the one or more representations of a benefit plan in each of the one or more client files, retrieve a template comprising a layout and a set of translation rules, wherein the layout comprises a plurality of field-to-attribute mappings that each map a field in the representation of the benefit plan to an attribute, map the plurality of field values in the representation of the benefit plan to a plurality of attribute values according to the plurality of field-to-attribute mappings, generate a benefit package comprising a plurality of components by applying the set of translation rules to the plurality of attribute values, automatically without any user input, wherein the benefit package represents the benefit plan and comprises a publication date, and wherein applying the set of translation rules to the plurality of attribute values comprises, for each of one or more rules in the set of translation rules, applying the rule according to one or more conditions to generate one of the plurality of components of the benefit package, wherein the plurality of components of the benefit package comprises a formulary, and wherein applying the set of translation rules to the plurality of attribute values further comprises generating a key by combining two or more of the plurality of attribute values into a character string, using the key as an index into a database of a plurality of existing formularies, when one of the plurality of existing formularies is retrieved by using the key as an index into the database, adding the retrieved existing formulary as the formulary of the benefit package, and, when none of the plurality of existing formularies is retrieved by using the key as an index into the database, generating a new formulary, and adding the new formulary to the plurality of existing formularies in the database, wherein the new formulary comprises a data structure comprising one or more data values, and wherein generating the new formulary comprises generating the data structure and automatically defining the one or more data values within the data structure, automatically activate the benefit package within a production environment on the publication date, and automatically adjudicate a plurality of benefit claims, submitted by one or more pharmacy systems over at least one network, according to the benefit package.

2. The method of claim 1, wherein the plurality of components of the benefit package comprises a cost share representing one or more of a copay, coinsurance, or accumulators limits of the represented benefit plan.

3. The method of claim 1, wherein the plurality of components of the benefit package comprise one or more fulfillment channels.

4. The method of claim 1, wherein the new formulary comprises a data structure comprising one or more data values, and wherein generating the new formulary comprises generating the data structure but not automatically defining the one or more data values within the data structure.

5. The method of claim 4, further comprising using the at least one hardware processor to prompt a user to define the one or more data values within the data structure of the new formulary.

6. The method of claim 1, wherein generating the key further comprises appending a prefix to the character string.

7. The method of claim 1, wherein generating the key further comprises appending a suffix to the character string.

8. The method of claim 1, wherein applying the rule according to one or more conditions comprises:

retrieving the one or more conditions referenced in the rule;

evaluating the retrieved one or more conditions by, for each of the one or more conditions, evaluating and comparing at least two expressions within the condition, wherein at least one of the at least two expressions references one or more of the plurality of attribute values; and applying the rule according to the evaluated one or more conditions.

9. The method of claim 1, further comprising using the at least one hardware processor to validate the client file while mapping the plurality of field values to the plurality of attribute values based on the layout.

10. The method of claim 9, further comprising using the at least one hardware processor to, after validating the client file, prompt a user, via a graphical user interface, to generate the benefit package via an input of the graphical user interface, wherein the benefit package is generated in response to a user operation of the input.

11. The method of claim 1, further comprising using the at least one hardware processor to:

determine that the client file is invalid while mapping the plurality of field values to the plurality of attribute values based on the layout; and notify a user, via a graphical user interface, that the client file was determined to be invalid, prior to generating the benefit package.

12. A server system comprising:

at least one hardware processor; and one or more software modules that, when executed by the at least one hardware processor, receive one or more client files, wherein each of the one or more client files comprises one or more representations of a benefit plan, and wherein each of the one or more representations of a benefit plan comprises a plurality of field values, and, for each of the one or more representations of a benefit plan in each of the one or more client files, retrieve a template comprising a layout and a set of translation rules, wherein the layout comprises a plurality of field-to-attribute mappings that each map a field in the representation of the benefit plan to an attribute, map the plurality of field values in the representation of the benefit plan to a plurality of attribute values according to the plurality of field-to-attribute mappings, generate a benefit package comprising a plurality of components by applying the set of translation rules to the plurality of attribute values, automatically without any user input, wherein the benefit package represents the benefit plan and comprises a publication date, and wherein applying the set of translation rules to the plurality of attribute values comprises,
    for each of one or more rules in the set of translation rules, applying the rule according to one or more conditions to generate one of the plurality of components of the benefit package, wherein the plurality of components of the benefit package comprise a formulary, and wherein applying the set of translation rules to the plurality of attribute values further comprises
        generating a key by combining two or more of the plurality of attribute values into a character string,
        using the key as an index into a database of a plurality of existing formularies,
        when one of the plurality of existing formularies is retrieved by using the key as an index into the database, adding the retrieved existing formulary as the formulary of the benefit package, and, when none of the plurality of existing formularies is retrieved by using the key as an index into the database, generating a new formulary, and adding the new formulary to the plurality of existing formularies in the database, wherein the new formulary comprises a data structure comprising one or more data values, and wherein generating the new formulary comprises generating the data structure and automatically defining the one or more data values within the data structure,
    automatically activate the benefit package within a production environment on the publication date, and
    automatically adjudicate a plurality of benefit claims, submitted by one or more pharmacy systems over at least one network, according to the benefit package.

13. A non-transitory computer-readable medium having instructions stored therein, wherein the instructions, when executed by a processor, cause the processor to:
    receive one or more client files, wherein each of the one or more client files comprises one or more representations of a benefit plan, and wherein each of the one or more representations of a benefit plan comprises a plurality of field values; and,
    for each of the one or more representations of a benefit plan in each of the one or more client files,
        retrieve a template comprising a layout and a set of translation rules, wherein the layout comprises a plurality of field-to-attribute mappings that each map a field in the representation of the benefit plan to an attribute,
    map the plurality of field values in the representation of the benefit plan to a plurality of attribute values according to the plurality of field-to-attribute mappings,
    generate a benefit package comprising a plurality of components by applying the set of translation rules to the plurality of attribute values, automatically without any user input, wherein the benefit package represents the benefit plan and comprises a publication date, and wherein applying the set of translation rules to the plurality of attribute values comprises,
        for each of one or more rules in the set of translation rules, applying the rule according to one or more conditions to generate one of the plurality of components of the benefit package, wherein the plurality of components of the benefit package comprise a formulary, and wherein applying the set of translation rules to the plurality of attribute values further comprises
            generating a key by combining two or more of the plurality of attribute values into a character string,
            using the key as an index into a database of a plurality of existing formularies,
            when one of the plurality of existing formularies is retrieved by using the key as an index into the database, adding the retrieved existing formulary as the formulary of the benefit package, and,
            when none of the plurality of existing formularies is retrieved by using the key as an index into the database, generating a new formulary, and adding the new formulary to the plurality of existing formularies in the database, wherein the new formulary comprises a data structure comprising one or more data values, and wherein generating the new formulary comprises generating the data structure and automatically defining the one or more data values within the data structure,
    automatically activate the benefit package within a production environment on the publication date, and
    automatically adjudicate a plurality of benefit claims, submitted by one or more pharmacy systems over at least one network, according to the benefit package.

\* \* \* \* \*